Patented Jan. 1, 1946

2,392,102

UNITED STATES PATENT OFFICE 2,392,102

RUST PREVENTIVE COMPOSITION

Paul M. Ruedrich, Berkeley, Calif., assignor to Tide Water Associated Oil Company, San Francisco, Calif., a corporation of Delaware No Drawing. Application February 1, 1941, Serial No. 377,025

4 Claims. (Cl. 106—14)

This invention relates to materials of the type commonly known as "rust preventives" which are applied to the surfaces of iron, steel, and other metals to prevent corrosion or rusting of the surface. In contradistinction to a paint or varnish, which is intended as a permanent protection, a rust preventive is of such a nature as to be readily removed by a hydrocarbon solvent such as gasoline, benzene, lubricating oil, and the like. Consequently, rust preventives find their chief application in the protection of the working surfaces of machinery parts, gun barrels, and the like.

In the protection of such metallic surfaces various materials have found use in the art. Some of these rust preventives are of such high viscosity at ordinary temperatures as to require hot application, sometimes requiring heating of the metal parts as well as the protective material for best results. Other preventives are supplied in a grease-like consistency which is spread on the surface to be protected. Some of these leave a non-drying grease-like coating, while others, upon evaporation of contained solvent, leave a firm wax-like coating. Still other preventives are supplied in sufficiently fluid condition that they may be applied with a brush.

In general, these preparations need to be applied in thick films or heavy coatings in order to satisfactorily protect the metal against corrosion. This is not only uneconomical, but also tedious and messy and involves the use of considerable quantities of solvent when it eventually becomes necessary to remove the rust preventive from the protected parts. Furthermore, heavy coatings are unsuitable for certain applications, for example, the protection of nails in storage, when it would be inconvenient to remove the coating before use. While a relatively thin film, as compared to most preventives, may be obtained by the use of paraffin wax, the coating is brittle at ordinary temperatures and is, therefore, subject to cracking and peeling. Paraffin has the added disadvantage of requiring hot application for best results.

It is the principal object of this invention to provide a rust preventive composition capable of protecting metal surfaces against corrosion for extended periods of time. A particular object is to provide a rust preventive composition capable of rendering such protection when applied in extremely thin films.

Another object is to provide an improved rust preventive which may be readily applied in any desired thickness of coating, but especially in extremely thin films.

Another object is the preparation of a new material suitable for use as a rust preventive by itself or in combination with other ingredients.

Other objects will be apparent from the following description.

The basic rust-preventive component of the composition of the present invention is a specially saponified lanolin or wool-grease. Crude woolgrease is a complex mixture of esters and alcohols of high molecular weight containing a considerable amount of free acids. Lactones and other oxidation products are also present. Upon removal of the major portion of the free acids and other impurities, lanolin, or refined wool-fat, is obtained. Lanolin, by itself, is a more or less satisfactory rust-preventive, being somewhat better than petrolatum for this purpose because of its more pronounced affinity for metals. According to the invention this property is greatly enhanced by treating the lanolin or wool-grease with lime, as hereinafter more fully set forth.

When lanolin is treated with calcium hydroxide at gradually increasing temperature the free acids are first neutralized and next the more readily saponifiable esters are reacted. As the saponification is continued a point is reached at which the partially saponified product will no longer be homogeneous upon cooling and will not completely dissolve in light hydrocarbon oils, such as Stoddard solvent or petroleum spirits. At this point the saponification is preferably discontinued. It is desirable to saponify as much of the material as possible without causing separation of the soap from the unsaponified matter. Some leeway is afforded in that it is not necessary to reach the point of non-homogeneity, while on the other hand a slight tendency towards separation of constituents is not prohibitive in some cases, and in any case can be corrected by the addition of a small amount of an homogenizer. For satisfactory saponification, from about 2 to 4% of calcium hydroxide is used, and, in the case of pure lanolin, the temperature attained at the end of the saponification will be from 400°–500° F. Under these conditions from about 15% to 30% of the total saponifiable matter of the lanolin will be converted into the calcium soap.

The product resulting from the above reaction, after drying by continued heating, is a sticky, wax-like material having excellent rust-preventive and metal-adhering properties. According to one phase of the invention it may be applied to metal surfaces by thinning with a hydrocarbon solvent such as naphtha, gasoline, benzene, lubricating oil and the like. Blended in small proportions (from 0.1% to 5.0%) in lubricating oil it behaves as an inhibitor against the corrosion sometimes experienced from ordinary mineral lubricating oils in machinery parts, for instance, in certain alloy bearings of automotive engines.

Instead of the purified lanolin, various grades of wool-grease may be employed. A superior product may be made from partially purified wool-grease analyzing not more than 15% free acids (calculated as oleic acid). The presence of the calcium soaps of these free acids enhances the compatibility of the partially saponified product with hydrocarbon solvents. Depending on the percentage of free acids, in the wool-grease, the quantity of lime which may be used may be increased and the temperature for the partial saponification may be decreased. For wool-grease containing about 13% of free acids from 2% to 7% of calcium hydroxide has been found to produce satisfactory saponification at a temperature of about 250° F. Under these conditions from about 15% to 60% of the total saponifiable matter (based on KOH saponification) of the wool-grease will be saponified with the lime, and the resulting product will be an unctous material which may be spread directly on the metal surface. If desired, it may be thinned with hydrocarbon solvents to aid in the application.

For the saponification of the lanolin or wool-grease, obviously the hydroxide of another alkaline earth metal may be substituted for the lime. For this purpose magnesium is to be classified as an alkaline earth metal, due to the similarity of the action of $Mg(OH)_2$ and $Ca(OH)_2$ in the saponification of fats and the similarity of the resulting soaps, though some authorities for other reasons prefer to classify magnesium otherwise. When magnesium hydroxide is used the resulting product, though satisfactory, is slightly less resistant to water than when lime is used. This is due to the greater tendency of the magnesium soaps to hydrolize with water. On the other hand, barium hydroxide yields an excellent product.

As stated above, the partially saponified lanolin or wool-fat may be applied to the surface to be protected by the use of solvents. Such solvents may preferably be volatile hydrocarbons. However, for special uses other solvents may be used for applying the material. For example, when it is desirable to reduce the fire hazard, chlorinated hydrocarbons (as carbon tetrachloride) may be used. An excellent solvent for this purpose is the semi-aromatic material obtained as extract when gasoline fractions are treated with a selective solvent such as liquid sulphur dioxide. If a 5% solution of the partially saponified wool-fat in such a semi-aromatic solvent is poured on a surface and the solvent allowed to evaporate, the resulting film is nearly dry, very smooth and uniform and has good rust-preventive properties. However, when extremely thin films, of the order of .0001 inch in thickness, are formed by the use of less concentrated solutions, the uniformity and protective ability of the film is considerably diminished. This is due to the colloidal nature of the calcium soaps and, also, partly due to the lack of adequate wetting ability of the unsaponified portion of the lanolin.

According to a preferred form of the invention the character of the film may be substantially improved by the addition of an homogenizer capable of causing the colloidal calcium soaps to become completely dissolved or dispersed. For this purpose various materials may be used with varying degree of effectiveness. Some examples of suitable homogenizers are: esters of fatty acids, such as capryl oleate and propylene glycol laurate; esters of petroleum acids, such as butyl naphthenate; ester-ethers, such as butyl ether of ethylene glycol oleate; alkylated phenols, such as ortho-amyl phenol; and esters of mineral acids, such as tricresyl phosphate and di-tertiary amyl-phenol sulphide. Other suitable homogenizers may suggest themselves to a skilled chemist. Depending of course on the particular homogenizer used, when from 1% to 10% of such materials is added to the partially saponified lanolin or wool grease, the resulting mixture, when diluted with a solvent as before and applied to metallic surfaces, forms a film quite uniform and free from any noticeable crystalline structure. Consequently the film attains a more pronounced protective effect than when the homogenizer is absent. The use of an homogenizer is particularly important when wax is one of the constituents of the rust-preventive compound as hereinafter more fully set forth.

An homogenizer particularly suitable for the requirements of the invention is a compound of the type exemplified by cyclohexylamylammonium - cyclohexylamylthiolthionocarbamate. This material may be prepared by reacting two molecules of N-amylcyclohexylamine with one molecule of carbon bisulphide. Its chemical formula is:

$C_6H_{11}(C_5H_{11})NCSSNH_2(C_5H_{11})C_6H_{11}$

This organic sulphur compound is extremely effective in bringing about a satisfactory dispersion of the calcium soaps in the unsaponified portion of the lanolin or wool-fat and in hydrocarbon solvents. Whereas most homogenizers, such as those previously mentioned, tend to produce a soft, greasy film when incorporated with the partially saponified lanolin and the mixture applied to metals, this preferred homogenizer produces a hard wax-like film which is quite resistant to mechanical abrasion. The quantity of this preferred homogenizer required for satisfactory dispersion of the calcium soaps is, also, substantially less than that required by most homogenizers. In addition, this material alone has a certain amount of rust preventive properties, and consequently is a preferred type of homogenizer to use in conjunction with the partially saponified lanolin.

Similar compounds of substantially equal effectiveness may be prepared by reacting with carbon bisulfide other N-alkyl-cyclohexylamines or dicyclohexylamine instead of N-amyl-cyclohexylamine. The resulting product may be represented by the general formula.

$C_6H_{11}(R)NCSSNH_2(R)C_6H_{11}$ where R represents an alkyl or cyclohexyl radical. For convenience in these specifications the term C. H. C. will be used to designate compounds of this structure.

For use in the preferred form of rust preventive, one part of C. H. C. to about 30 parts of partially saponified lanolin may be used. Smaller or larger quantities of C. H. C. may be used with varying degrees of the resulting dispersion. The most effective range is one part of the C. H. C. to between 20 and 50 parts of the partially saponified lanolin.

This mixture, when thinned sufficiently with any of the solvents previously mentioned and applied to metal surfaces, will, upon evaporation of the solvent, leave an extremely thin film of protective material which will be very uniform and will protect the metal from corrosion for extended periods of time.

For maximum protection of the metal surface it is important that the rust preventive have a low surface tension both towards the metal and towards the occluded moisture generally present on metallic surfaces, in order that the preventive may penetrate into the microscopic and submicroscopic pores of the metal and rigidly adhere thereto. Consequently, increased adhesion and further increased protective qualities may be attained by adding a surface tension depressant, or penetrant, to the preventive. This is of especial importance when the preventive is to be applied in very thin films.

Various materials are known in the art which, when added in small quantities, are capable of reducing the surface tension of mineral oils, such as for example, octyl alcohol, phenyl ether of ethylene glycol, hexahydrophenol, methyl salicylate, trilauryl phosphate, and dioctyl ester of calcium sulphosuccinate. In general such materials are suitable for depressing the surface tension of the partially saponified lanolin, particularly when the latter is dispersed in a hydrocarbon solvent as mentioned above.

Most penetrants suitable for such use have a considerable affinity for water. In fact, the affinity for water is an important function in enabling the preventive to penetrate the film of occluded moisture on the metal surface. However, such affinity for moisture has a slight tendency to reduce the moisture resistant qualities of the preventive into which such a penetrant is incorporated. Consequently, a penetrant's affinity for water is at the same time an advantage and a disadvantage when the same is incorporated into a rust preventive.

It has been found that high molecular weight organic acid salts of the more volatile amines are peculiarly suited for use as penetrants in the invention. Such salts have the ability of markedly reducing the surface tension of the rust preventive. They have sufficient affinity for water to allow the rust preventive composition to penetrate the film of moisture on metallic surfaces. In addition, after application and on being exposed to the air, these salts gradually decompose with attendant evaporation of the amine. Consequently the material, soon after application, loses its affinity for water and maximum protection against corrosion is attained. The proper rate of decomposition of the amine salt is attained by choice of amine of proper volatility. If too volatile an amine is used the amine will escape from the rust preventive composition during storage. Whereas, if the volatility of the amine is too low the decomposition may require an extensive time after application. Monoamylamine, monobutylamine, and morpholine have volatilities of the most advantageous order of magnitude and hence are preferred amines. Examples of suitable organic acids are: linoleic acid, fatty acids of twelve or more carbon atoms, abietic acid, and naphthenic acids. Linoleic acid is especially suited to the purposes of the invention because, after decomposition of its amine salt and evaporation of the amine, it has drying properties which tend to harden the rust preventive film.

When any of these amine salts is added in small proportions of about ¼% to 1% to the rust preventive composition it enables the partially saponified wool-fat to penetrate the smallest pores of metallic surfaces. This property is of major importance in a rust preventive which is to be applied in extremely thin films in order that the material may penetrate into the small indentations and microscopic pinholes where corrosion normally starts. Though of primary importance in the manufacture of thin film rust preventives the use of a penetrant, particularly one of these amine salts, is advantageous in the manufacture of rust preventives which are applied in thicker layers. In fact such an amine salt may be advantageously incorporated into almost any of the rust preventives commonly employed.

Up to this point it has been shown that an excellent rust-preventive may be made with partially saponified wool-fat as a base (useful itself as a rust preventive under certain conditions) to which has been added from 1.0 to 5.0% of C. H. C., from ¼ to 1% of amine-organic acid salt, and a volatile hydrocarbon thinner in suitable proportions to leave, upon evaporation, the desired thickness of film. Metallic objects treated with this preparation resist corrosion almost indefinitely when exposed to the atmosphere, providing acid vapors, such as hydrochloric acid, nitric acid, or hydrogen sulphide are absent. In order to give protection against vapors of this class, paraffin (preferably high melting point), beeswax, or other wax, may be incorporated into the mixture. For this purpose amorphous waxes of high melting point are preferred. The particular amount of wax is not critical, fair results being obtained with as low as 10% to 20% of wax. However, it is preferred to use from 30% to 50% wax. When the percentage of wax is to great the mixture becomes less resistant to air and water, besides the coating becomes more brittle and, consequently, less adherent to the metal.

When wax is incorporated into the rust-preventive it is important that sufficient amount of one of the homogenizers mentioned above be used to render the partially saponified wool-fat compatible with the wax. In the absence of an homogenizer the wax and partially saponified wool-fat tend to separate and produce a non-homogeneous film upon application. When the proper amount of homogenizer is used the film will be quite uniform even when it is very thin.

The preferred rust preventive of the invention is a combination of the partially saponified wool-fat with the additives described above. These additives are:

(A) Paraffin, beeswax, or other wax,
(B) Homogenizer, particularly C. H. C.,
(C) Penetrant, particularly morpholine linoleate, and
(D) Solvent, particularly volatile hydrocarbons.

By combining these additives with the partially saponified wool-fat a general utility rust-preventive composition is obtained which overcomes the various disadvantages normally present in a thin film rust-preventive, thereby making possible the use of the composition to effectively coat metallic surfaces with coatings 0.0001 inch or less in thickness. The preferred proportions of these materials are as follows:

| | Parts |
|---|---|
| Partially saponified wool-fat | 50 to 80 |
| Paraffin, beeswax, or other wax | 20 to 50 |
| Homogenizer | 0.5 to 5 |
| Penetrant | 0.1 to 1 |
| Solvent | 500 to 2,000 |

While a rust-preventive suitable for some purposes may be obtained by the elimination of any one or more of these additives, a serious disadvantage is obtained when the resulting composition is supplied to the metal in very thin layers of the order of magnitude mentioned above. To illustrate; the wax may be omitted from the composition. The resulting mixture may be applied in thin films which will be protective against water and moist air, but it will not afford good pro-protection against acid fumes in very thin films. If the homogenizer is omitted a non-homogeneous coating is obtained which, though effective in thicker coatings, is not uniform enough for best protection when very thin coatings are employed. Likewise, the penetrant may be omitted when the coating is thick enough to effectively exclude air and water. When thin films are employed, however, it is highly desirable that the coating penetrates all the pores of the metal. The solvent is necessary as a means of readily applying the material in a thin film. Consequently, the solvent may be reduced in quantity or entirely eliminated when thicker coatings are desired. Likewise, if softer coatings are desired, the solvent may contain a proportion of material of non-volatile nature such as lubricating oil.

In the foregoing description particular emphasis was placed upon a rust preventive for application in extremely thin films which can be applied by dipping or spraying. Such preventives have properties and uses which are unique in this field. However, the invention, in its broader aspect, is not limited to the requirements of thin film preventives and the composition may be varied to meet other requirements. For example, machinery parts are at times stored or shipped in assembled, or semi-assembled, condition. Particularly is this true of automotive engines. In such cases the thickness of film is not as important as ease of removal of the film by simple flushing. Again, at times, thicker coatings are desired in order to insure absolute protection. Under such conditions, it is advisable to vary the composition by including a considerable amount of lubricating oil into the preventive. In such cases, the composition may be most conveniently applied with a brush. Such a composition may have the following formula, which results in a product having a consistency similar to a semi-fluid cup grease:

|  | Parts |
| --- | --- |
| Partially saponified wool fat | 50 to 80 |
| Paraffin, beeswax, or other wax | 20 to 50 |
| Homogenizer | 0.5 to 5 |
| Penetrant | 0.1 to 1 |
| Volatile solvent | 30 to 70 |
| Lubricating oil | 30 to 70 |

Following are examples of methods which may be employed in the manufacture of the preferred type of rust preventive:

*Example 1*

Sixty pounds of wool-fat containing about 13% of free fatty acids, are placed in a steam kettle and heated to about 200° F. 1.8 pounds of calcium hydroxide are slowly added with stirring. The heating of the mixture is continued for one hour and the temperature is gradually raised so that it reaches a maximum of 250° F. at the end of this period. Then the application of heat is discontinued. In this manner approximately 20% to 25% of the total saponifiable matter of the wool-fat is converted into calcium soap. In treating wool-fat, it is advisable not to continue the saponification beyond this point because high temperatures adversely effect the stability and also impair the quality of the soap. If the partially saponified wool-fat contains less than 15% soap its consistency is unsatisfactory and the product has little value as a base for thin film rust preventives.

After completing the saponification and dehydration of the calcium lanolate 37.5 pounds of amorphous paraffin wax are added and thoroughly incorporated into the liquid mass. The preferred type of wax should have a melting point of aproximately 140° F.

Before proceeding further, it is advisable to lower the temperature of the mixture to approximately 150° F. A solution of 2 pounds of C. H. C. in 18 pounds of petroleum spirits is then added and intimately blended with the other two components.

The final step involves the addition of the wetting agent which may be morpholine linoleate. A solution of half a pound of this material in half a pound of petroleum spirits is added and blended with the mixture.

To the rust preventive base, prepared as above, are added 1130 pounds (170 gallons) of petroleum spirits. Any small amount of free lime is removed by settling, filtering, or centrifuging. The finished product is transparent and amber colored, becoming cloudy when cooled to about 50°-60° F., and opaque at about 45° F. The product prepared in this manner is especially suitable, due to the large amount of volatile thinner, for application by spraying or dipping to produce a very thin film of highly protective nature.

*Example 2*

Sixty pounds of a highly refined wool-fat (lanolin) are placed in a fire kettle and heated to about 200° F. 1.8 pounds of calcium hydroxide are slowly added with stirring. The heating of the mixture is continued for one hour and the temperature is gradually raised so that it reaches a maximum of 440°-460° F. at the end of this period, at which point the heating is discontinued. In this manner 20% to 25% of the total saponifiable matter of the lanolin is converted into calcium soap.

After dehydration of the partially saponified lanolin, paraffin wax, homogenizer, penetrant and solvent are added as in Example 1.

*Example 3*

A rust preventive base is prepared as in Example 1, including the partially saponified wool-fat, wax, homogenizer, and penetrant. To 2 parts of this base are added 1 part of petroleum spirits and 1 part of refined lubricating oil, the latter having a viscosity of 210 seconds Saybolt Universal at 100° F. The product thus obtained is of the consistency of a thick paint and may be brushed on the surface to be protected in any desired thickness.

As used in the accompanying claims, the term "wool-fat" indicates a refined or unrefined wool-grease, provided it shall contain saponifiable material such as esters and preferably some free acidity as herein pointed out.

I claim:

1. A rust-preventive composition having the following approximate formula: wool-fat having its normally contained esters partially saponified with an alkaline earth metal hydroxide, 50 to 80 parts; wax, 20 to 50 parts; a solvent for said wool-fat and said wax, 500 to 2000 parts; a surface tension depressant, 0.1 to 1 part; and an homogenizer capable of rendering the constituents mutually completely soluble, 0.5 to 5 parts; said partially saponified wool-fat being wax-like and substantially homogeneous at ordinary atmospheric temperature.

2. A rust-preventive composition having the following approximate formula: wool-fat having its normally contained esters partially saponified with lime, 50 to 80 parts; amorphous wax, 20 to 50 parts; a volatile hydrocarbon liquid, 500 to 2000 parts; morpholine linoleate, 0.1 to 1 part; and from 0.5 to 5 parts of a material having the chemical formula $C_6H_{11}(R)NCSSNH_2(R)C_6H_{11}$ where R represents an alkyl or cyclohexyl radical; said partially saponified wool-fat being wax-like and substantially homogeneous at ordinary atmospheric temperature.

3. A rust-preventive composition having the following approximate formula: wool-fat having its normally contained esters partially saponified with an alkaline earth metal hydroxide, 50 to 80 parts; wax, 20 to 50 parts; a solvent for said wool-fat and said wax, 30 to 70 parts; lubricating oil 30 to 70 parts; a surface tension depressant 0.1 to 1 part; and an homogenizer capable of rendering the constituents mutually completely soluble, 0.5 to 5 parts; said partially saponified wool-fat being wax-like and substantially homogeneous at ordinary atmospheric temperature.

4. A rust-preventive composition having the following approximate formula: wool-fat having its normally contained esters partially saponified with lime, 50 to 80 parts; amorphous wax, 20 to 50 parts; a volatile hydrocarbon liquid, 30 to 70 parts; lubricating oil, 30 to 70 parts; a volatile amine salt of a high molecular weight organic acid, 0.1 to 1 part; and from 0.5 to 5.0 parts of a material having the chemical formula $$C_6H_{11}(R)NCSSNH_2(R)C_6H_{11}$$

where R represents an alkyl or cyclohexyl radical; said partially saponified wool-fat being wax-like and substantially homogeneous at ordinary atmospheric temperature.

PAUL M. RUEDRICH.